(12) United States Patent
Kitada (10) Patent No.: US 7,548,330 B2
(45) Date of Patent: Jun. 16, 2009

(54) IMAGE PROCESSING APPARATUS AND ITS CONTROL METHOD

(75) Inventor: Atsushi Kitada, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 12/244,969

(22) Filed: Oct. 3, 2008

(65) Prior Publication Data

US 2009/0033967 A1 Feb. 5, 2009

Related U.S. Application Data

(60) Division of application No. 11/860,964, filed on Sep. 25, 2007, now Pat. No. 7,515,287, which is a continuation of application No. PCT/JP2007/058478, filed on Apr. 12, 2007.

(30) Foreign Application Priority Data

Apr. 13, 2006 (JP) ............................. 2006-110698

(51) Int. Cl.
*G06K 15/00* (2006.01)
(52) U.S. Cl. ..................................... 358/1.14; 358/1.18
(58) Field of Classification Search ................ 358/1.14, 358/1.15, 3.28, 1.18, 1.12; 382/289; 715/764; 348/370

See application file for complete search history.

(56) References Cited

U.S. PATENT DOCUMENTS

| 5,758,049 A * | 5/1998 | Johnson et al. ............. 715/206 |
| 2007/0127056 A1* | 6/2007 | Hirano et al. .............. 358/1.14 |

FOREIGN PATENT DOCUMENTS

| JP | 8-190636 | 7/1996 |
| JP | 2000-48216 | 2/2000 |
| JP | 2000-330757 | 11/2000 |
| JP | 2002-55803 | 2/2002 |
| JP | 2006-35712 | 2/2006 |

* cited by examiner

*Primary Examiner*—Jerome Grant, II
(74) *Attorney, Agent, or Firm*—Fitzpatrick, Cella, Harper & Scinto (57) ABSTRACT

In the case of providing a variable data print, it is an object to provide an image processing apparatus in which the user can take a countermeasure against an error more rapidly. When a variable data printing process is started, whether or not image data is inaccessible is discriminated to all image data used in the printing process. If there is the inaccessible image data at this point of time, the user is notified of it and the printing process is cancelled. At this time, a path name of the image data and a name of a record to which the path name belongs are simultaneously displayed and such a record is directly previewed.

3 Claims, 9 Drawing Sheets

| RECORD | PRINT | NUMBER OF COPIES | STORE NAME | MAP IMAGE DATA |
|---|---|---|---|---|
| 1 | ☑ | 1 | GINZA STORE | ¥¥share¥ginza.bmp |
| 2 | ☑ | 2 | JIYUGAOKA STORE | ¥¥share¥jiyugaoka.bmp |
| 3 | ☑ | 1 | NIHONBASHI STORE | ¥¥share¥nihonbashi.bmp |

SELECT ALL | CANCEL SELECTION | OK | CANCEL

IMAGE PROCESSING APPARATUS AND ITS CONTROL METHOD

This is a divisional of U.S. patent application Ser. No. 11/860,964, filed Sep. 25, 2007, which is a continuation of No. PCT/JP2007/058478, filed Apr. 12, 2007.

This application is a continuation of International Application No. PCT/JP2007/058478 filed on Apr. 12, 2007, which claims the benefit of Japanese Patent Application No. 2006-110698 filed on Apr. 13, 2006.

BACKGROUND OF THE INVENTION

1. Field of the Invention

The invention relates to an image processing apparatus for displaying text data or image data in a memory unit onto a display and outputting to a printing unit and to a control method for such an apparatus.

2. Description of the Related Art

Up to now, application software which operates on a personal computer, that is, various application software to form posters have been released. Most of them have been formed on the assumption that printing is performed by a large-format printer.

Therefore, on the personal computer which handles data of high resolution and executes its printing process when printing poster data, a large load is forced to such a process. Thus, even in the present situation in which advanced performance of the personal computer and the large-format printer has been realized, it takes a long time for the user upon printing of the poster.

Also in those applications, such a variable data printing function that one of specific text object and image object is replaced with data in a database held by the customer without changing a whole layout design and is printed is demanded.

For example, in the case where a juristic person having a plurality of stores prints and distributes posters for sale of seasonal products every store, even if the whole layout design is identical, such an application that addresses and map data of those stores are changed every store and the posters are printed is presumed.

As a technique regarding such variable data print, several techniques have been known (for example, refer to Japanese Patent Application Laid-Open Nos. H08-190636 and 2000-048216).

SUMMARY OF THE INVENTION

Problem to be Solved by the Invention

In the inventions disclosed in the above Patent Documents, although the techniques for the variable data print have been opened, nothing is disclosed with respect to a process for the error peculiar to batch printing which becomes a problem upon large-format printing in which the high-load process is forced.

Upon large-format printing, irrespective of whether or not it is the batch printing, a long time and large costs are generally required. From such a viewpoint, a mechanism adapted to avoid wasteful printing as much as possible has to be provided. Particularly, a state where the image data which is referred to as image data for the variable data becomes inaccessible exists for a period of time between edition of the poster using the variable data and execution of the batch printing.

Such a situation that the printing is performed without confirming a preview of each record (print processing unit) is also considered. An image data file exists independent of the poster application and a state where the image data file becomes inaccessible by an unexpected accident can occur. As an example of such a case, there is an accident such as network trouble, system shut-down, or the like which occurs in the case where the image data is stored in a common server and shared.

In the large-format printing in which the number of copies which need a long printing time is large, there is such a tendency that the user often leaves the apparatus and executes processes at night or the like. If not only a warning regarding such an error occurrence is displayed during or after completion of the batch printing but the warning is immediately displayed when the error can be detected at the start of the printing, it contributes to the reduction in costs for the user's countermeasure against the error.

The invention relates to a variable data printer for replacing an object on a master template with data which a connected database has and executing a printing process in units of record in the database. It is an object of the invention to provide an image processing apparatus in which the user can more rapidly take a countermeasure against an error in the case of providing a variable data print.

Means for Solving the Problem

According to the invention, in an image processing apparatus which provides a variable data print, whether or not image data is accessible is discriminated before an actual printing process.

Advantages of the Invention

According to the invention, in the image processing apparatus which provides the variable data print, since whether or not the image data is accessible is discriminated before the actual printing process, there is such an effect that the user can more rapidly take the countermeasure against the error.

Further features of the present invention will become apparent from the following description of exemplary embodiments with reference to the attached drawings.

DESCRIPTION OF THE EMBODIMENTS

A best mode for carrying out the invention is for following embodiment.

First Embodiment

An editing operation and a printing process of a variable data print which operates as a part of application software on a personal computer will be described.

Figure 1:
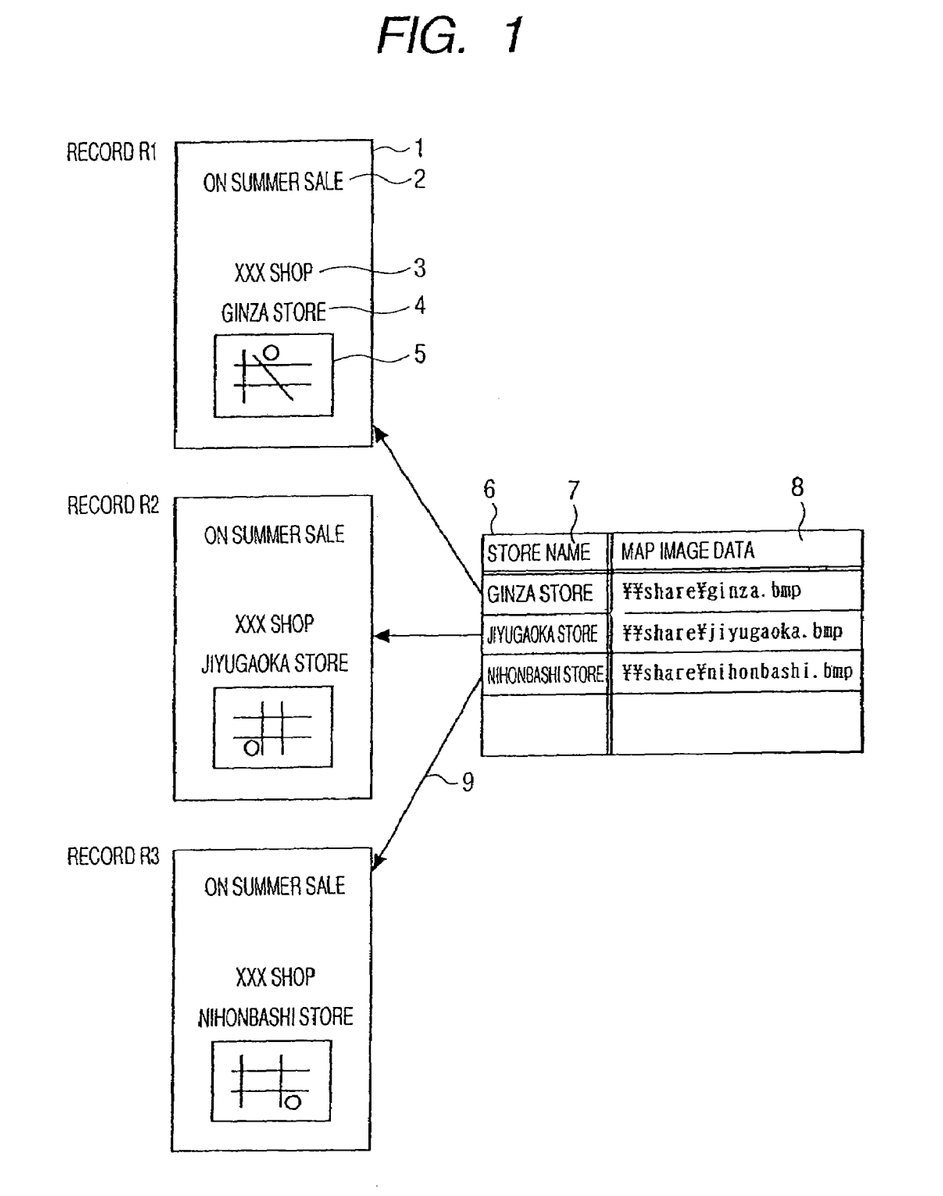
FIG. 1 is a conceptual diagram illustrating a variable data print according to a first embodiment of the invention.

FIG. 1 is a conceptual diagram illustrating the variable data print according to a first embodiment of the invention.

A text object and an image object on a master template have been replaced with data on each record in a connected database and displayed.

In records R1, R2, and R3, data of a store name field 7 and a map image data field 8 of each record R in a database 6 has been referred to.

In the variable data print, a fundamental layout design of each object defined on a master template has been held in common on each record R.

Page contents 1 of the record R1 are objects 2 to 5. As for the text objects 2 and 3, since they are not associated as variable objects with the database, in other records, a same character string is displayed at same size and position.

The text object 4 has been associated as a variable object with the store name field in the database. Therefore, the text object 4 is replaced with a character string "GINZA STORE" in the first record R1 in the database and displayed.

The image object 5 has been associated as a variable object with the map image data field in the database. Therefore, the image object 5 is replaced with image data shown by "¥¥share¥ginza.bmp" existing in the first record R1 in the database and displayed.

In a manner similar to the above, as for the records R2 and R3, the variable objects are also changed by using data of fields on the second and third records R in the database and displayed.

In the first embodiment, a data replacement processing method is not particularly specified. In a text data replacing process, an automatic layout process in which a font size is changed or a position and a size of the object are changed according to a length of text data to be replaced may be also executed.

In the image replacing process, the size is adjusted so that the whole image lies within a boundary of the image object on the corresponding master template. However, in the case of replacing it with image data whose aspect ratio is extremely large, since the image is displayed small, an automatic trimming process may be also executed.

A format of the database 6 is not specified either in the invention. It may be a simple table data format such as a CSV (Comma Separated Values) format or a general database which provides various functions.

Figure 2:
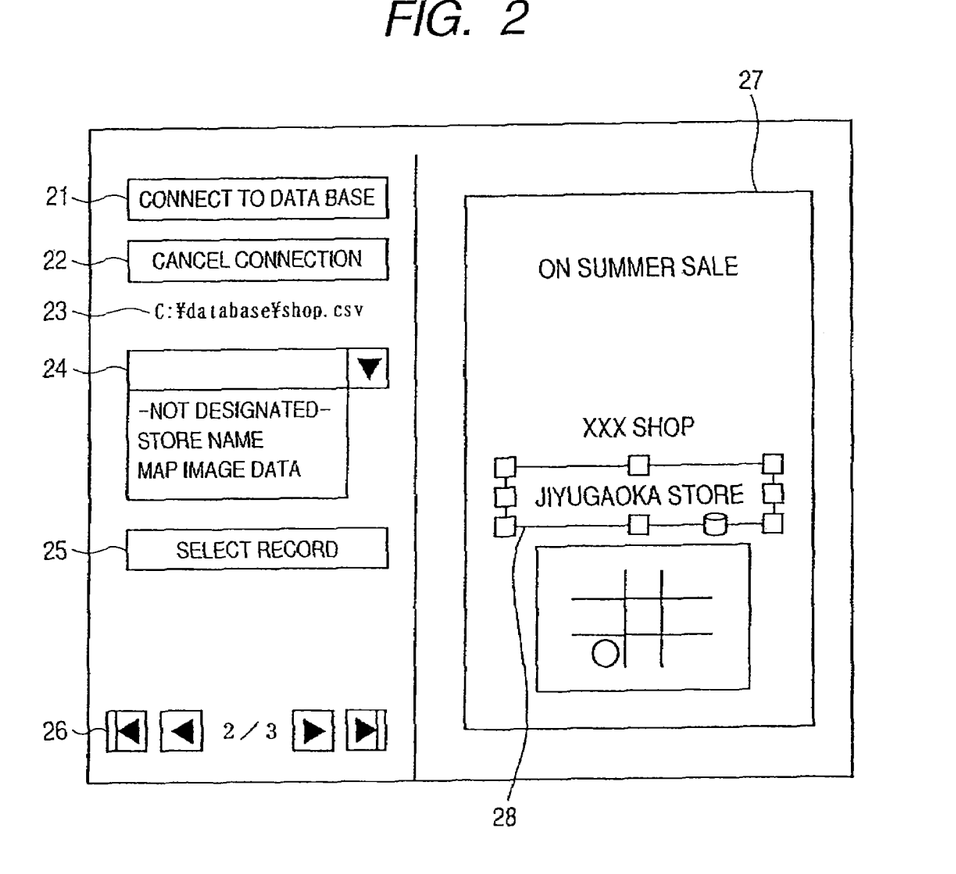
FIG. 2 is a diagram illustrating a GUI display screen of application software having a function of the variable data print according to the first embodiment of the invention.

FIG. 2 is a diagram illustrating a GUI display screen of application software having a function of the variable data print according to the first embodiment of the invention.

In such a display screen, connection to a desired database, association of the object on the master template with the field in the database, selection of the print target record, and preview in units of record can be executed.

A button 21 is a button to designate the desired database. By selecting the button 21, a display screen to select the accessible database is displayed on the personal computer and the database selected on the selecting display screen is opened and connected to the master template.

A button 22 is a button to cancel the connection to the connected database. If an object on the master template has been associated with the field in the database, by selecting the button 22, the association is cancelled and the button 22 enters a state where it cannot be selected. A label of a path name 23 also indicates a non-connecting state.

The path name 23 is a path name of the connected database. If the database is in the non-connecting state, a character string showing that it is in the non-connecting state is displayed.

A dropdown list 24 is a dropdown list for displaying a list of names of the fields held by the connected database. The dropdown list 24 can be selected when the single object of the master template on a preview display 27 is in a selecting state. By selecting an arrow on the right side, the list of the field names is displayed. When the object is selected, if the object has been associated with the field, the field name is displayed. If it is not associated, a head "NOT DESIGNATED" is displayed.

In addition, by selecting an arbitrary field in this state, the selected object and the field can be newly associated.

By selecting the head "NOT DESIGNATED", the state which has already been associated with another field can be cancelled. If at least one object associated with the field exists, button groups 25 and 26 can be selected.

The button group 25 displays all records in the database and displays a record selecting display screen (FIG. 3) to select a print target record from the records.

The button group 26 is a button group for preview-displaying, in units of record, the master template on the preview display 27 in which the variable object has been replaced.

By selecting the buttons at the left and right edges, the head and last records can be displayed, respectively. By selecting other two buttons shown inside of each of those buttons, the records before and after the target record can be displayed, respectively. The records displayed at present and the total number of records are displayed as a numerator and a denominator at the center. In this example, a state where information indicating that the preview of the second record has been performed is displayed is shown.

The preview display 27 is a preview display of the master template. A text object 28 shows that the text object associated with the field existing in the connected database is in the selecting state.

As mentioned above, when the object on the master template is in the selecting state, the dropdown list 24 can be selected. The names of the fields associated at present are displayed and the fields can be associated with an arbitrary field.

Figure 3:
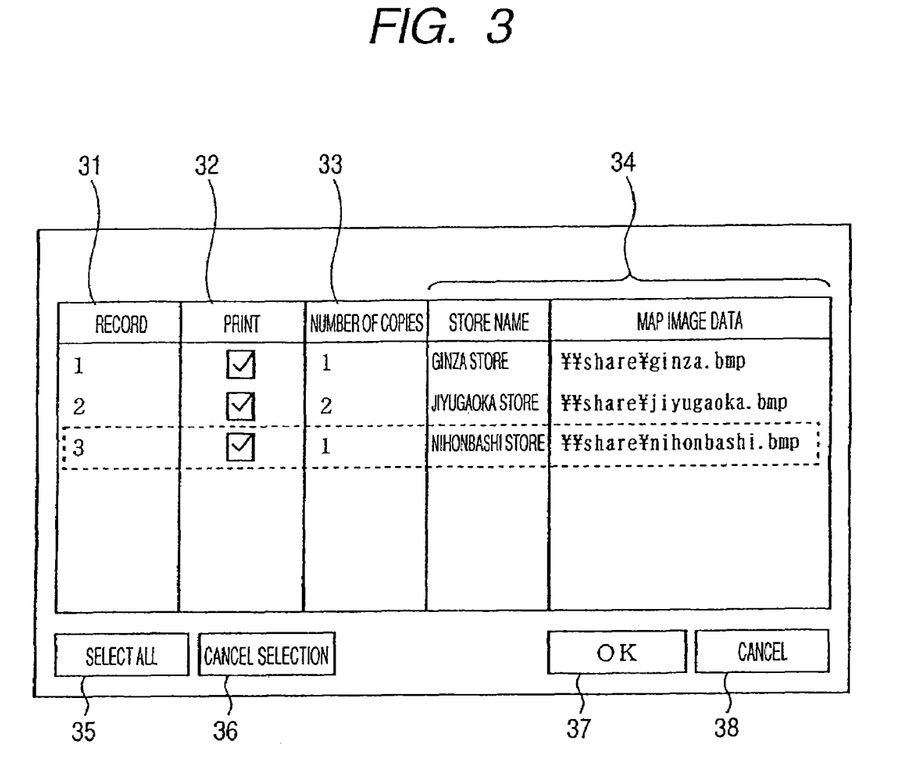
FIG. 3 is a diagram illustrating a record selecting display screen which is provided by the application software having the function of the variable data print according to the first embodiment of the invention.

FIG. 3 is a diagram illustrating a record selecting display screen which is provided by the application software having the variable data printing function according to the first embodiment of the invention.

This display screen is displayed by selecting the button 25.

A column 31 of record numbers is a column of the record numbers in the connected database. An example in which the apparatus has been connected to the database having three records is illustrated in the column 31.

A check box 32 is a check box to select whether or not the record is set to a print target. By turning on the check box 32, the record can be set to the print target. At the time of the initial display of the record selecting display screen, this check box is ON in all of the records. That is, all of the records are set to the print targets. The user can exclude the unnecessary records from the print targets by turning off this check box.

The number of copies 33 is the number of copies of the record as a print target. For each record, by clicking a numeral portion of the number of copies by a mouse the user can set the record into an editable state and input a desired number of copies within a settable range. In the initial state, the number of copies of all of the records is equal to 1.

A field name group 34 is a group of the names of the fields held in the database. This example shows that the connected database has two fields of "STORE NAME" and "MAP IMAGE DATA" is displayed. Both of them are text data. If the field is associated with the image object, the text data is handled as meta data and recognized as a path name to the image data.

In addition, on such a display screen, if there is an inaccessible path name in the text of the field associated with the image object, this text is displayed as an emphasized image.

A button 35 is a button for setting all of the displayed records to the print targets. A button 36 is a button for excluding all of the records from the print targets.

An OK button 37 and a cancel button 38 are pressed to specify or cancel the operation executed on the display screen and close this display screen.

Figure 4:
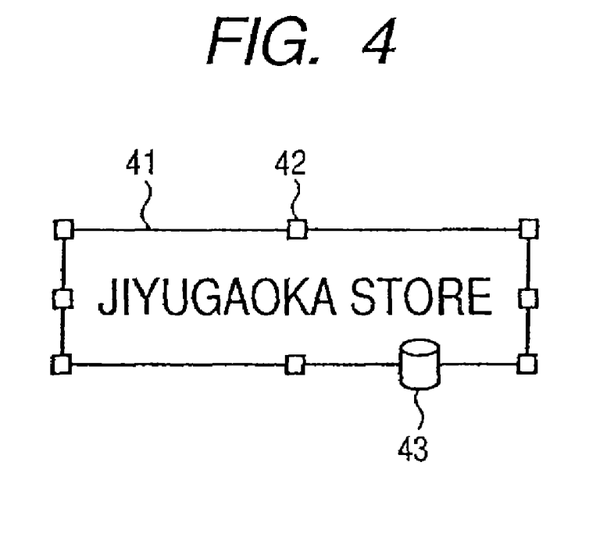
FIG. 4 is a diagram illustrating a text object associated with a field in a database in a selecting state on a master template preview display according to the first embodiment.

FIG. 4 is a diagram illustrating the text object associated with the field in the database in the selecting state on a master template preview display according to the first embodiment.

A selection frame 41 of the text object is in the same state as that of the text object 28. By dragging a resize handler 42 of the object by the mouse, the object can be zoomed or variable-magnified.

When the resize handler of a diagonal is selected, this object can be resized while maintaining the aspect ratio. When the resize handler of a side is selected, the object can be resized by being deformed in the vertical or lateral direction.

A variable object 43 in the object is an icon showing that the object has been associated with the field in the connected database. Thus, on the preview of the master template, the user can visually recognize whether or not the object is a variable object.

Figure 5:
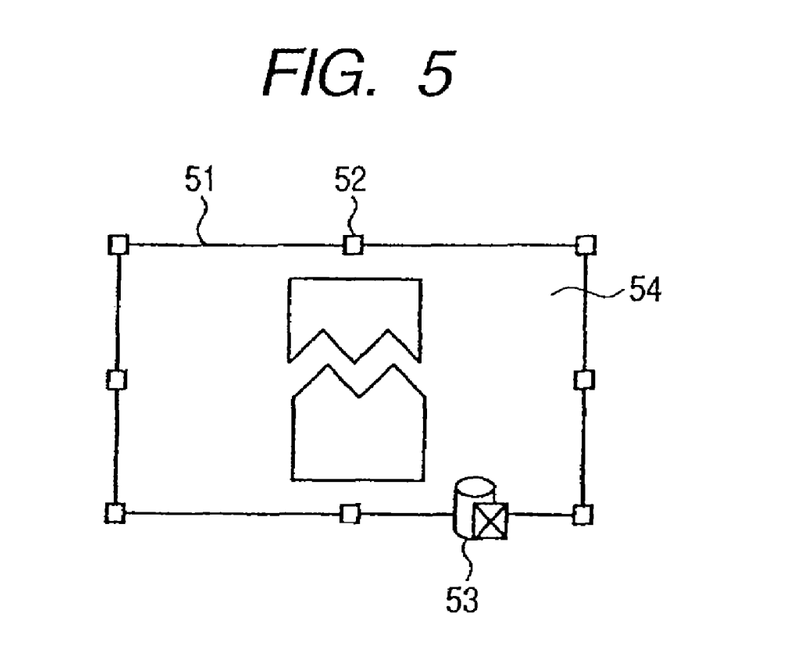
FIG. 5 is a diagram illustrating an image object which is associated with the field in the database in the selecting state and is in a state where it is impossible to access image data to be referred to on the master template preview display according to the first embodiment.

FIG. 5 is a diagram illustrating an image object which is associated with the field in the database in the selecting state and is in a state where it is impossible to access image data to be referred to on the master template preview display according to the first embodiment.

Reference numerals 51 and 52 denote a selection frame 51 of the image object and a resize handler 52 of the object and are the same as the selection frame 41 and the resize handler 42, respectively.

An icon 53 is an icon showing that the object has been associated as a variable object with the field in the connected database. The icon 53 differs from the icon design 43 in order to show that its image format is an image format in which it is impossible to access the image data indicated by the relevant image object or an image format which is not supported.

A dummy image 54 is another means for showing that the object is inaccessible. Thus, the user can visually recognize that the image data on the relevant record is a variable image object which is inaccessible at present.

Figure 6:
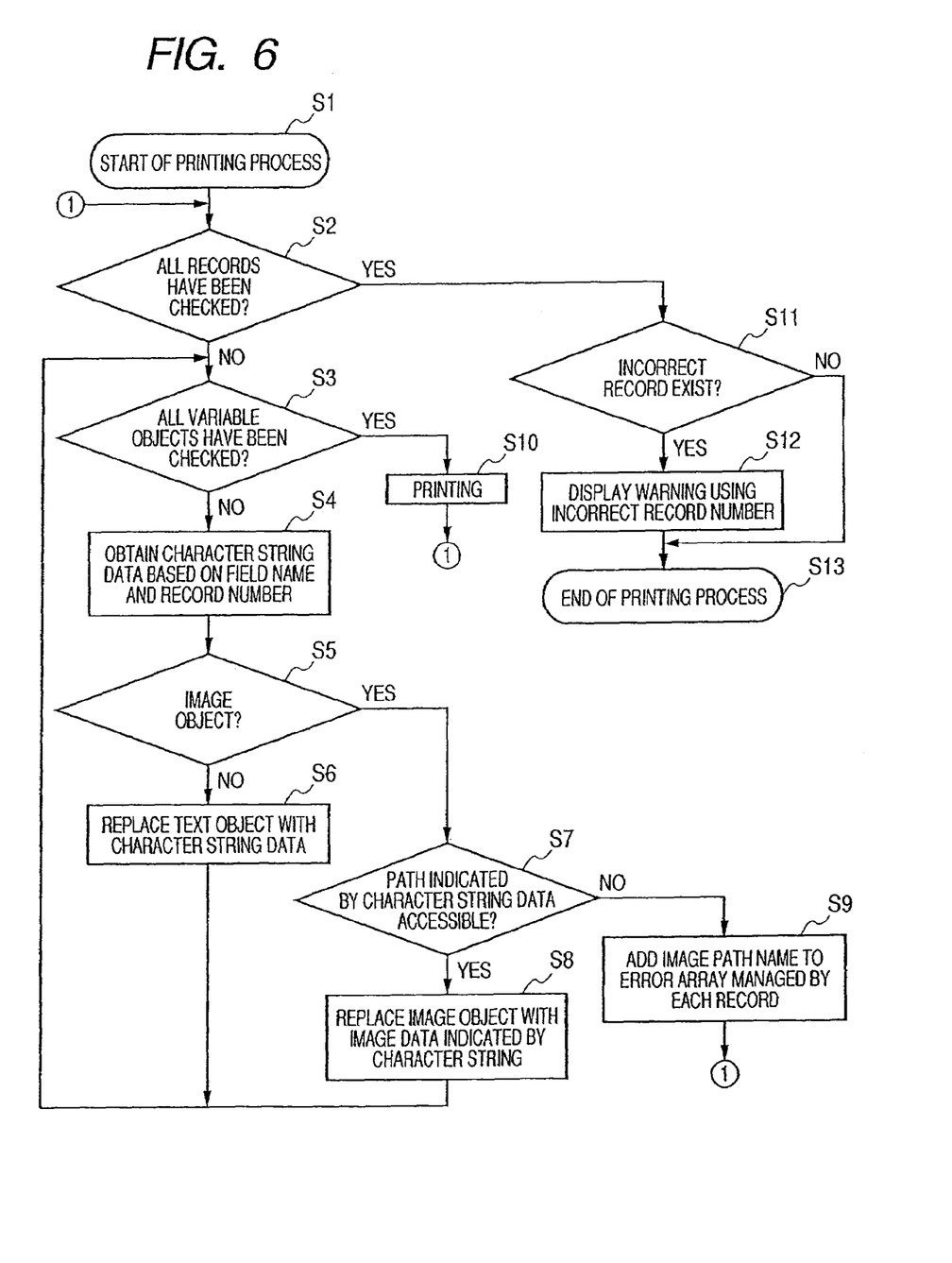
FIG. 6 is a flowchart showing a printing process which is provided by the variable data print according to the first embodiment.

FIG. 6 is a flowchart showing a printing process which is provided by the variable data print according to the first embodiment.

S1 denotes the start of the printing process of the variable data print. S2 to S9 show a repeating process for all of the records serving as print targets. If the processes for all of the records have been completed, S11 follows. If there are records whose printing process is not completed, S3 follows.

S3 to S9 indicate a repeating process for all of the variable objects on the master template. If the processes for all of the variable objects have been completed, S10 follows. The printing process of the relevant record is executed by the number of copies designated by the number of copies 33.

In S4, the field name associated with the variable object serving as a check target is obtained and the text data (character string data) in the connected database is obtained based on the field name and the number of the record which is a processing target at present.

In S5, whether or not the variable object is an image object is discriminated. If it is not the image object, it is determined that the variable object is a text object and the text data of the variable object is replaced with the text data obtained in S4.

If it is determined in S5 that the variable object is the image object, in S7, the text data obtained in S4 is interpreted as a name of the path to the image data and whether or not the path is accessible is discriminated.

If it is determined in S7 that the path is accessible, the image data of the variable object is replaced with the image data of the relevant path name. If it is determined in S7 that the path is inaccessible, S9 follows. The relevant image path name is added to an error array managed by each record and the processing routine is returned to S2 in order to check the next record. That is, the record which refers to the inaccessible image path is not printed.

S11 corresponds to the state where the checks to all of the records have been finished. The error array managed by each record is checked here. If there is at least one error-detected record in S7, a warning is displayed by using the number of the relevant record in S12. Thus, the user can know the number of the print-failed record at the end of the printing.

Figure 7:
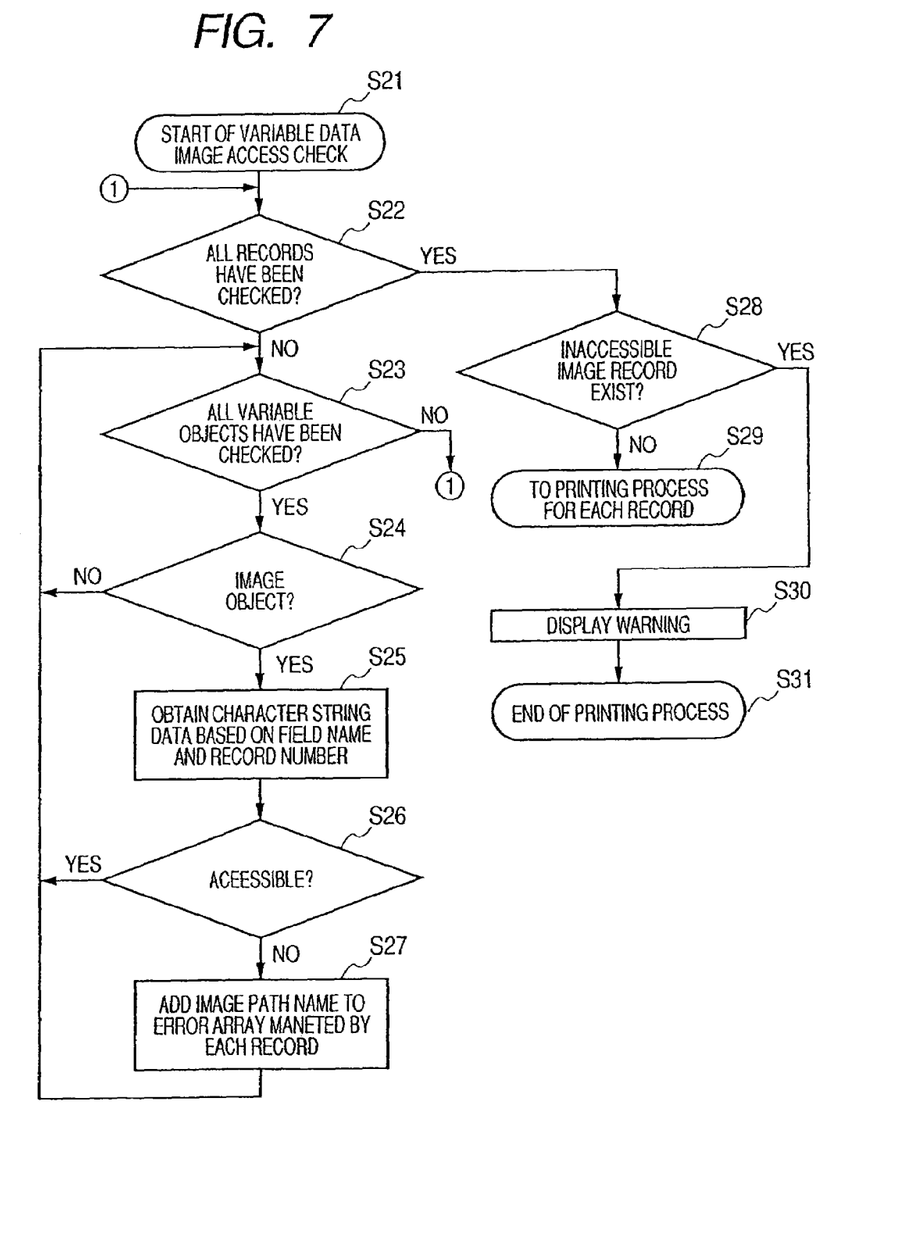
FIG. 7 is a flowchart showing a whole variable data checking process which is executed just before the printing process of the variable data print according to the first embodiment is started.

FIG. 7 is a flowchart showing a whole variable data checking process which is executed just before the start of the printing process of the variable data print according to the first embodiment is started.

Incidentally, it does not matter if the whole variable data checking process is executed before the start of the printing process of the variable data print even when it is not executed just before the start of the printing process of the variable data print.

S21 shows a start of an access checking process of the image data which is referred to by the variable object. S22 to S27 show a repeating process for all of the records serving as print targets. If the processes for all of the records have been completed, S28 follows. If there are records whose printing process is not completed, S23 follows.

S23 to S27 indicate a repeating process for all of the variable objects on the master template. If the processes for all of the variable objects have been completed, the processing routine is returned to S22 and the process to the next record is executed.

In S24, whether or not the variable object is an image object is discriminated. If it is not the image object, the processing routine is returned to S23 and the check to the next variable object is executed. If it is the image object, S25 follows.

In S25, the field name associated with the variable object serving as a check target is obtained and the text data in the connected database is obtained based on the field name and the number of the record which is a processing target at present.

In S26, the text data obtained in S25 is interpreted as a name of the path to the image data and whether or not the path is accessible is discriminated. If the path is accessible, the processing routine is returned to S23 and the check to the next variable object is executed. If the path is inaccessible, S27 follows. The relevant image path name is added to the error array managed by each record. The processing routine is returned to S23 and the check to the next variable object is executed.

S28 corresponds to the state where the checks to all of the records have been finished. The error array managed by each record is checked here. In S26, if there is at least one record which has been detected to be inaccessible, S30 follows and a warning is displayed. The whole printing process is finished in S31.

If it is determined in S28 that all of the image data which are referred to by the variable object is accessible, S29 follows and the actual printing process is executed. This printing process corresponds to S1 mentioned above.

Since the warning is displayed in S30, the user can know that the error occurs before the long printing process is started. Therefore, at this point of time, the user can take a countermeasure against the error. If such a process is not executed, as shown in FIG. 6, the error is notified after completion of the printing process which takes a long time for all of the records, so that the timing when the user takes the countermeasure against the error is delayed.

In this example, the check is made only by discriminating whether or not the image data is inaccessible. However, in addition to such a discrimination, it is also possible to also discriminate whether or not the image format is an image format supported by the relevant image data and to determine the error even in the case of an image format other than the supported image formats.

Figure 8:
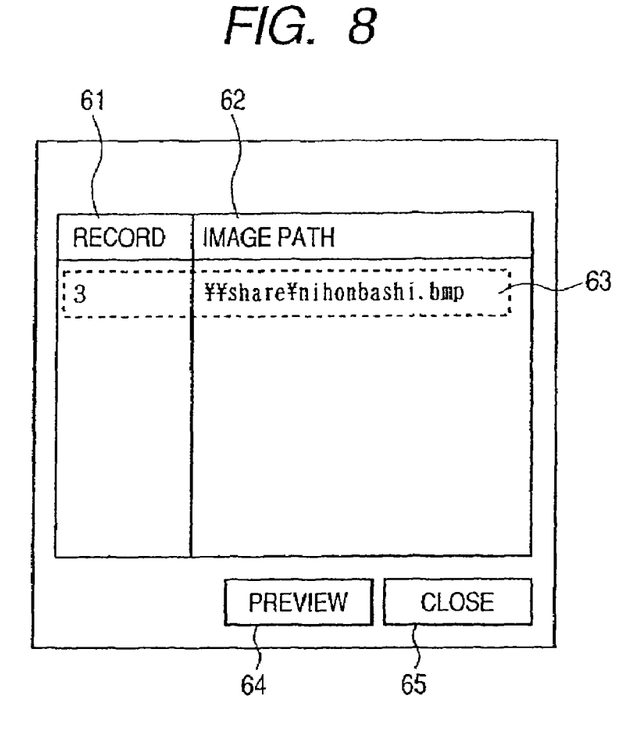
FIG. 8 is a diagram illustrating a display screen which displays a list of inaccessible image data according to the first embodiment.

FIG. 8 is a diagram illustrating a display screen for displaying a list of the inaccessible image data according to the first embodiment.

This display screen is displayed in S30 mentioned above.

A record number 61 is the number of the record having the image path which has been determined to be inaccessible. A column 62 is a column of the image path. If a plurality of image data is made inaccessible on the same record, their path names are divided by commas or the like and collectively displayed in a column. Reference numeral 63 indicates that "¥¥share¥nihonbashi.bmp" which is referred to by Record 3 is inaccessible and is in a selecting state on the above list.

A button 64 is a button to display the record. By selecting the button 64, the records in the selecting state on the above list can be directly preview-displayed in 27.

If the image data is still in the inaccessible state, on the preview, it is possible to confirm that the dummy image as shown in FIG. 5 is displayed. If the preview button is merely selected, the above display screen is not closed. Therefore, other records can be continuously previewed.

A button 65 is a button to close the above display screen.

Figure 9:
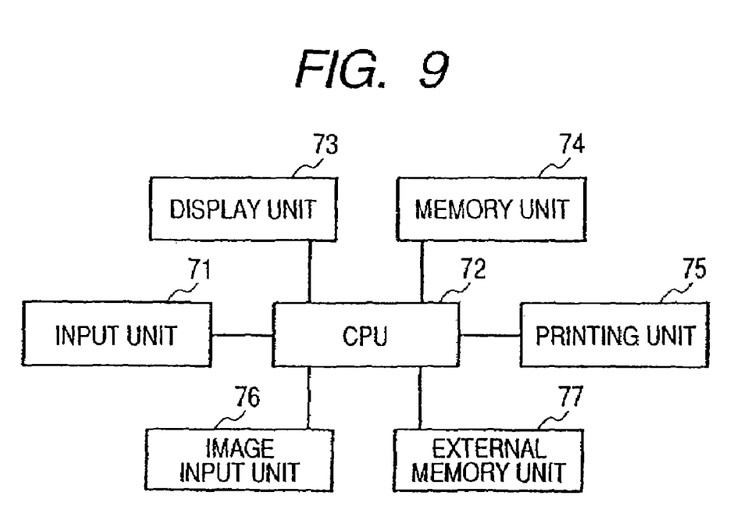
FIG. 9 is a diagram illustrating a construction of an image processing apparatus according to the first embodiment.

FIG. 9 is a diagram illustrating a construction of an image processing apparatus according to the first embodiment.

An input unit 71 is an input unit such as keyboard, mouse, or the like. A central processing unit 72 is a central processing unit for executing management control of a system, input and correction of an input image, a forming process of edition data for printing, and the like. A display unit 73 is a display unit which is used to display. A memory unit 74 is a memory unit such as a hard disk or the like for storing the image data file and a corresponding image correction command history file. A printing unit 75 is a printing unit for outputting the edition data. An image input unit 76 is an image input unit such as film scanner, flat bed scanner, digital camera, or the like. An external memory unit 77 is an external memory unit corresponding to a medium (memory) which is used in a floppy (registered trademark) drive, a digital camera, or the like. Programs for executing the flowcharts of FIGS. 6 and 7 are stored in the memory unit 74, read out by the central processing unit 72, and executed. The image processing apparatus of FIG. 9 can be also embodied as a system constructed by a computer and peripheral equipment. In this case, the computer is constructed by the input unit 71, central processing unit 72, display unit 73, and memory unit 74. The embodiment can be realized by the system in which the printing unit 75 has been connected to the computer. The programs for executing the flowcharts of FIGS. 6 and 7 can be also downloaded from an external apparatus through an electric communication line and stored into the memory unit 74.

Figure 10:
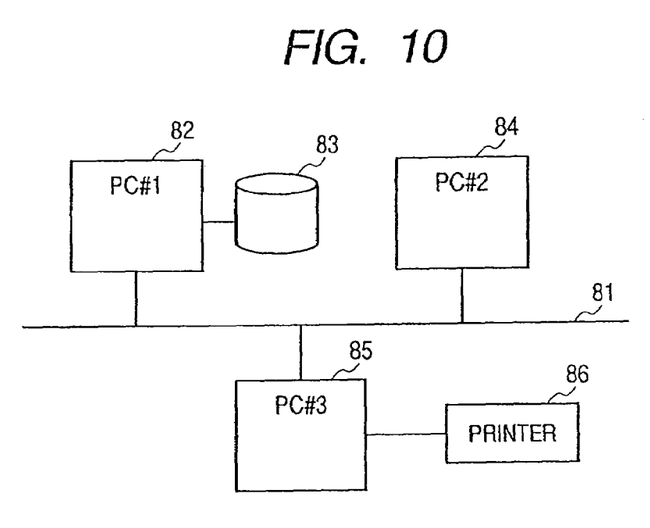
FIG. 10 is a constructional diagram of PCs each for executing the variable data print according to the first embodiment and their network.

FIG. 10 illustrates a computer network constructed by a plurality of PCs (personal computers) and shows an example in which the first embodiment is realized on this network.

Reference numeral 81 denotes an LAN (Local Area Network). A plurality of PCs 82, 84, and 85 are connected onto the LAN. Reference numeral 83 denotes a shared directory connected to the PC 82. A state where data in the shared directory can be also accessed from the PCs 84 and 85 is illustrated. Reference numeral 86 denotes a printer connected to the PC 85 through a communication interface such as a USB (Universal Serial Bus) or the like.

In this constructional diagram, it is assumed that the application of FIG. 2 is executed on the PC 85 and the database file opened in FIG. 3 is a file held on a hard disk in the PC 85. It is also assumed that the substance of the map image data in the field name group 34 in FIG. 3 exists in the shared directory 83.

In addition, in S7 in FIG. 6 and S26 in FIG. 7, the following cases are considered as a state where the path of the image data becomes inaccessible. ∈A communication path from the PC 85 to the shared directory 83 has been disconnected. ∉The relevant data has been deleted or moved by another user. ∠ There is no access authority of the relevant shared directory. The situation where the path becomes inaccessible can also occur by a factor other than those factors.

Final printed matter is output to the printer 86 by the variable data printing process which is executed on the PC 85.

Figure 11:
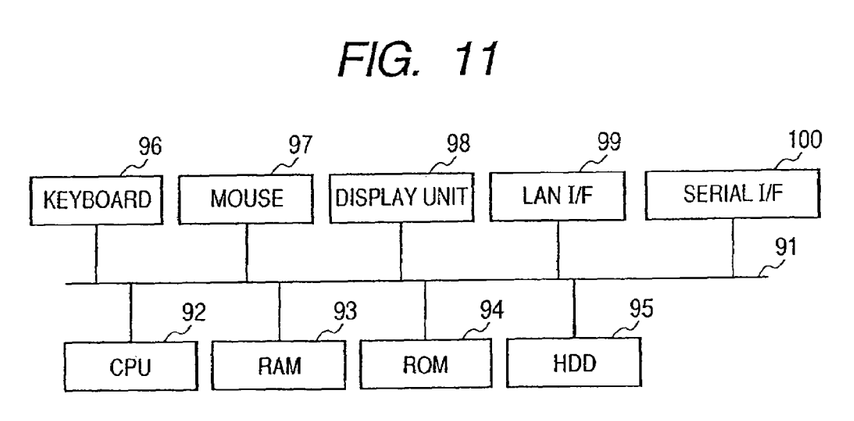
FIG. 11 is a diagram illustrating an internal construction of the PCs according to the first embodiment.

FIG. 11 is a conceptual diagram of an internal construction of the PCs 82, 84, and 85.

Reference numeral 91 denotes a system bus as a basic bus of the PCs. A CPU as a central processing unit, a RAM for loading the executing programs, and a ROM and an HDD as memory units are connected onto the bus. A keyboard and a mouse as input units and a display as a display unit are also connected. In addition, an LAN interface connected to the LAN 81 in FIG. 10 and a serial interface connected to an external apparatus such as a printer 86 or the like are also connected.

A substance of the program of the application in the first embodiment is held in a hard disk 95. When the program is activated by an instruction of the user, it is loaded into a RAM 93 from the hard disk. After that, the loaded program is executed by a CPU 92. The program of the application may be held in a ROM 94 as a non-volatile memory unit. Similarly, upon activation, the program is loaded into the RAM 93 and executed by the CPU 92.

Figure 12:
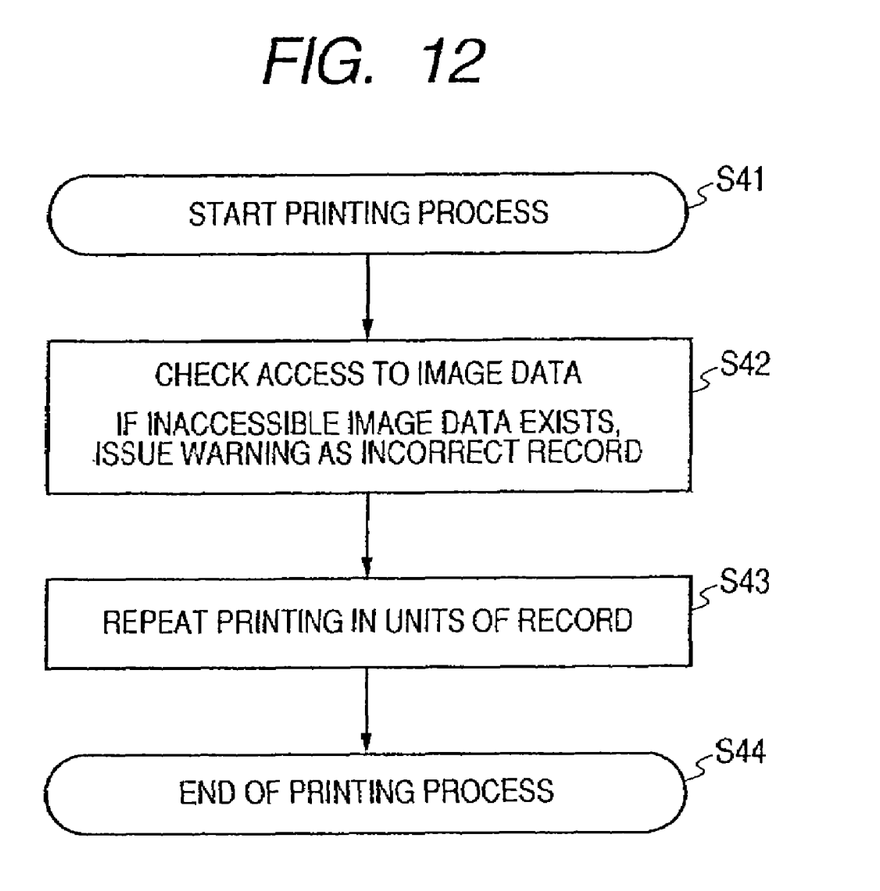
FIG. 12 is a diagram showing a processing flow for the variable data print according to the first embodiment.

FIG. 12 is a flowchart in which the printing process shown in FIGS. 6 and 7 is simplified and which shows to which portions in the whole printing process FIGS. 6 and 7 correspond.

S41 shows the start of the printing process of the variable data print. S42 shows a step in which the whole process of FIG. 7 has been simplified and disclosed. S43 shows a step in which the whole process of FIG. 6 has been simplified and disclosed. Prior to executing the printing process in units of record, in S42, this application discriminates whether or not the image data which is used upon printing of the relevant record is accessible with respect to all of the records as targets of the variable data print. At this time, information of the inaccessible image data is held. In S42, a warning is displayed based on the information of the held image data and, after the warning is displayed, the printing process is temporarily finished without automatically executing the actual printing process. It is also possible to construct in such a manner that after the warning was displayed, if the user selects the operation for recording the record having no inaccessible image data (record in which the image data is accessible), the processing routine advances to S43. Subsequently, if it is determined in S42 that there are no inaccessible data as a result of the check about the inaccessible image data, the ordinary printing process in units of record which is executed in the variable data print is executed in S43. It is a feature of the invention that prior to printing in units of record in S43, the check about the inaccessible image data and the display of the warning based on the information of the inaccessible data are performed to all of the image data of all of the records in S42.

According to the above embodiment, in the image processing apparatus which provides the variable data print, the check about the inaccessible image data is made prior to executing the actual printing process. Therefore, the user can take the countermeasure against the error more rapidly.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2006-110698, filed Apr. 13, 2006, which is hereby incorporated by reference herein in its entirety.

What is claimed is:

1. An image processing apparatus in a variable data print in which a specific image object is replaced with data in a database held by a customer without changing a whole layout design and is printed, comprising:
checking means which checks data of records that are referred to in the variable data print in the database and discriminates the presence or absence of inaccessible image objects;
notifying means which notifies a user of information on the inaccessible image objects; and
control means that:
(i) makes said checking means check data of all the records before the start of printing the first record in the variable data print, if there are inaccessible image objects as a result of the check of the data of all the records by said checking means, makes said notifying means perform the notification without starting the print process, and if there are not the inaccessible image objects, starts the print process for each record, and
(ii) makes said checking means check data of each record in the print process for each record, if there are the inaccessible image objects as a result of the check of the data of each record by said checking means, does not execute the print process for the record, and if there are not the inaccessible image objects, executes the print process for the record and executes the print process for each record with relation to all the records.

2. A control method of an image processing apparatus in a variable data print in which a specific text object or image object is replaced with data in a database held by a customer without changing a whole layout design and is printed, comprising:
a checking step of checking all data that is referred to in the variable data print by using path names of a table in the database prior to starting the printing and discriminating the presence or absence of inaccessible image objects; and
a notifying step of notifying a user of path names of the inaccessible image objects if there are the inaccessible image objects as a result of the check in the checking step,
wherein data of all the records is checked before the start of printing the first record in the variable data print, if there are inaccessible image objects as a result of the check of the data of all the records a notification is performed without starting the print process, and if there are not the inaccessible image objects the print process is started for each record, and
wherein data of each record is checked in the print process for each record, if there are the inaccessible image objects as a result of the check of the data of each record the print process for the record is not executed, and if there are not the inaccessible image objects the print process for the record is executed and the print process for each record with relation to all the records is executed.

3. A program, embodied in a computer-readable medium, for allowing a computer to execute a control method in a variable data print in which a specific text object or image object is replaced with data in a database held by a customer without changing a whole layout design and printed,
wherein the program comprises:
a checking step of checking all data that is referred to in the variable data print by using path names of a table in the database prior to starting the printing and discriminating the presence or absence of inaccessible image objects;
a notifying step of notifying a user of path names of the inaccessible image objects if there are the inaccessible image objects as a result of the check in the checking step; and
wherein data of all the records is checked before the start of printing the first record in the variable data print, if there are inaccessible image objects as a result of the check of the data of all the records a notification is performed without starting the print process, and if there are not the inaccessible image objects the print process is started for each record, and
wherein data of each record is checked in the print process for each record, if there are the inaccessible image objects as a result of the check of the data of each record the print process for the record is not executed, and if there are not the inaccessible image objects the print process for the record is executed and the print process for each record with relation to all the records is executed.

* * * * *